United States Statutory Invention Registration [19]

[11] Reg. Number: H752

Suzuki et al. [43] Published: Mar. 6, 1990

[54] MAGNETIC RECORDING MEDIUM

[75] Inventors: Atsushi Suzuki, Utsunomiya; Shigeru Koyama, Ichikai, both of Japan

[73] Assignee: Kao Corporation, Tokyo, Japan

[21] Appl. No.: 240,494

[22] Filed: Sep. 1, 1988

[30] Foreign Application Priority Data

Sep. 4, 1987 [JP] Japan ..... 62-221467

[51] Int. Cl.[4] ..... G11B 5/66; G11B 5/70

[52] U.S. Cl. ..... 428/694

*Primary Examiner*—John F. Terapane
*Assistant Examiner*—Philip Tucker

[57] ABSTRACT

A magnetic recording medium comprising a non-magnetic support, a magnetic layer, and an undercoat layer provided therebetween, and said undercoat layer comprising: (A) at least one resin selected from the group consisting of polyester resins having one or more hydroxyl groups and polyurethane resins having one or more hydroxyl groups; (B) a polyisocyanate compound (C) at least one compound selected from the group consisting of organometallic compounds and tertiary amine compounds; and (D) carbon black having an average single particle size of 50 μm or smaller and an oil absorption of 100 g DBP/100 g or less; and having an (A)/(D) content ratio of 30/70 to 70/30, by weight, a (B) content of 15 to 50 wt. % based on component (A), and a (C) content of 0.5 to 5 wt. % based on component (A).

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNETIC RECORDING MEDIUM

BACKGROUND OF THE INVENTION

1. Field of the Invention

The present invention relates to a magnetic recording medium. More specifically, it relates to a magnetic recording medium of a coating type comprising an undercoat layer provided between a non-magnetic support and a magnetic layer.

2. Description of the Background Art

A magnetic recording medium has recently been required to have a higher recording density and hence is under investigations with a view to improving the magnetic layer thereof by an adequate method such as incorporation there into of a finer magnetic material at a higher filling ratio or formation of a thinner film as the magnetic layer for the purpose of heightening the recording density thereof. When the magnetic layer is improved by such a method, however, the adhesion of the magnetic layer to a support and the coating film strength of the magnetic layer tend to deteriorate, resulting in poor durability of the magnetic recording medium. In order to improve the durability, there has heretofore been employed a method in which a support is coated with an undercoating liquid containing a polyester or a polyurethane resin dissolved in an organic solvent.

However, the use of any such conventional undercoating liquid involves the possibility that an undercoat layer, formed by application and drying the liquid, is swollen with or dissolved in an organic solvent contained in a magnetic coating upon application of the magnetic coating on the undercoat layer to the detriment of the smoothness of the interface between the magnetic layer and the undercoat layer to deteriorate the smoothness of the surface of the magnetic layer. This presents problems including a decrease in output and an increase in output variation. In view of his, there is employed a method in which a polyisocyanate compound is added to an undercoating liquid to crosslink therewith a resin contained in the undercoating liquid for suppressing the swelling or dissolution of an undercoat layer formed therefrom with a solvent. However, it can hardly be said that the effect of this method is sufficient.

SUMMARY OF THE INVENTION

Under such circumstances, the inventors of the present invention have made extensive investigations to find that, when a specific resin having one or more hydroxyl groups, a polyisocyanate compound, at least one compound selected from the group consisting of organometallic compounds and tertiary amine compounds, and a specific carbon black are used as the components for forming an undercoat layer, the swelling or dissolution of the undercoat layer with a solvent contained in a magnetic coating can be sufficiently suppressed to provide a magnetic recording medium having good surface properties and excellent durability. The present invention has been completed based on this finding.

DETAILED DESCRIPTION OF THE INVENTION

Specifically, the present invention provides a magnetic recording medium comprising a non-magnetic support, a magnetic layer, and an undercoat layer provided therebetween, and the undercoat layer comprising:

(A) at least one resin selected from the group consisting of polyester resins having one or more hydroxyl groups and polyurethane resins having one or more hydroxyl groups, (B) a polyisocyanate compound, (C) at least one compound selected from the group consisting of organometallic compounds and tertiary amine compounds, and (D) carbon black having an average single particle size of 50 μm or smaller and an oil absorption of 100 g DBP/100 g or less;

and has an (A)/(D) content ratio of 30/70 to 70/30, by weight, a (B) content of 15 to 50 wt. % based on component (A), and a (C) content of 0.5 to 5 wt. % based on component (A).

Any polyester or polyurethane resin can be used in the present invention without any particular limitation insofar as it has one or more hydroxyl groups in one or more molecular terminal ends or one or more branched chains thereof. Examples of usable commercially available polyester resins include Vilon 103, Vilon 200, Vilon 280, Vilon 290, Vilon 300, and Vilon 500 manufactured by Toyobo Co., Ltd.; and Unitika Elitel UE-3200, Unitika Elitel UE-3201, Unitika Elitel UE-3300, and Unitika Elitel UE-3400 manufactured by Unitika Ltd.

Examples of usable commercially available polyurethane resins include Nippolan 5032, Nippolan 5033, and Nippolan 2301 manufactured by Nippon Polyurethane Industry Co., Ltd.

The polyisocyanate compound (B) to be used in the present invention is a compound having two or three isocyanate groups per molecule thereof and may be aromatic, aliphatic or alicyclic. Examples of commercially available polyisocyanate compounds include Coronate L, Coronate HL, and Coronate EH manufactured by Nippon Polyurethane Industry Co., Ltd.; and Sumidur L, Sumidur IL, Desmodur HL, Sumidur N, Sumidur HT, and Sumidur W manufactured by Sumitomo Bayer Urethane K.K.

In the present invention, the polyisocyanate compound is used in an amount of 15 to 50 parts by weight per 100 parts by weight of a polyester or polyurethane resin having one or more hydroxyl groups or a mixture thereof. When the polyisocyanate compound is used in an amount of less than 15 parts by weight, there is insufficient crosslinking. When it is used in an amount exceeding 50 parts by weight, it disadvantageously takes a long time to complete the reaction of the isocyanate groups of the polyisocyanate compound. When any unreacted polyisocyanate compound remains, the blocking tendency of the resulting undercoat layer increases, resulting in troubles such as sticking thereof to rolls during the course of application of a magnetic coating.

Examples of the organometallic compound that may be used in the present invention include trisacetylacetonatoiron (III) $[FEC_5H_7O_2)_3]$, trisacetylacetonatomanganese (III) $[Mn(C_5H_7O_2(3]$, dibutyltin dioctoate, dibutyltin diacetate, dibutyltin dilaurate, dioctyltin dilaurate, tin octenoate, tin oleate, lead naphthenate, lead oleate, tetraisopropyl titanate, and tetra-n-butyl titanate.

Examples of the tertiary amine compound that may be used in the present invention include triethylenediamine, triethylamine,

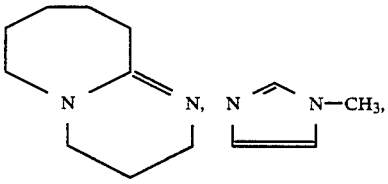

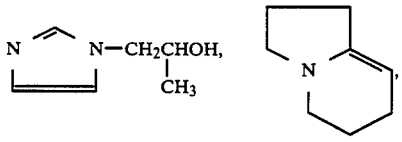

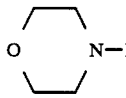

N—R (R is an alkyl group),

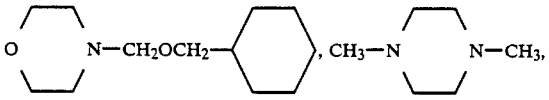

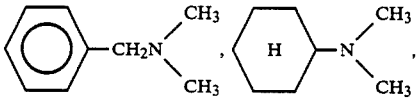

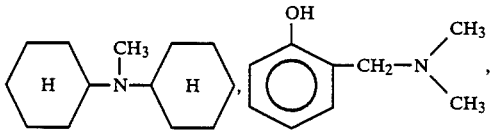

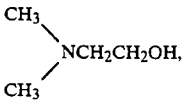

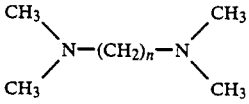

wherein n = 2,3,4,5 or 6,

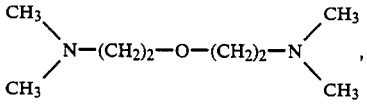

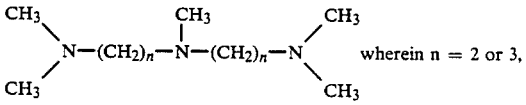

wherein n = 2 or 3, and

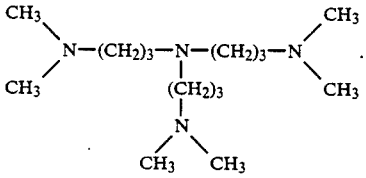

Organometallic compounds are preferred as component (C). Among them, trisacetylacetonatoiron (III) is referred.

The amount of component (C) to be used is 0.5 to 5 wt. % based on the component (A). When it is less than 0.5 wt. %, the completion of the hardening reaction of the resulting undercoat layer is greatly retarded. When it exceeds 5 wt. %, there arise troubles such as blooming on the surface of the resulting undercoat layer.

The carbon black (D) to be used in the present invention is a specific carbon black which has an average single particle size of 50 μm or smaller and an oil absorption of 100 g DBP/100 g or less. If these requisites of carbon black are not satisfied, no marked effect of the present invention is achieved.

The component (D) is used in an amount corresponding to an (A)/(D) content ratio of 30/70 to 70/30, by weight.

The content ratio of (A), (B), (C), and (D) is very important in the present invention. As described above, it is indispensable that the (A)/(D) content ratio be 30/70 to 70/30, by weight, while the (B) content be 15 to 50 wt. % based on component (A). An excellent undercoat layer according to the present invention can be obtained for the first time when these requisites are satisfied.

The undercoat layer is formed by coating a non-magnetic support with an undercoating liquid composed of the above-mentioned components (A) to (D) dissolved in an organic solvent such as acetone, methyl ethyl ketone, cyclohexanone or ethyl acetate according to a coating method such as gravure coating or reverse-roll coating and drying the resulting coating film. An inorganic pigment such as other carbon black or titanium oxide may be added to the undercoating liquid for the purpose of providing antistatic properties or improving the light-screening properties.

The components of a magnetic coating constituting the magnetic layer of the magnetic recording medium of the present invention are not particularly limited and hence any materials commonly used may be used as such. Examples of usable magnetic powders include ferromagnetic powders such as γ-iron, Co-containing Y-iron oxide, a reduced iron powder, and powders of alloys such as an iron-cobalt-nickel alloy. Usable binders include synthetic or semisynthetic polymers such as polyvinyl chloride, vinyl chloride-vinyl acetate copolymers and their partial saponification products, polyvinyl butyral, phenoxy resins, epoxy resins, polyester resins, polyacrylonitrile, polyurethanes, polyacrylic esters, polymethacrylic esters, polyvinylidene chloride, cellulose acetate butyrate, and cellulose nitrate, which may be used either alone or in mixture. If necessary, the magnetic coating may further comprise a plasticizer such as dibutyl phthalate or dioctyl phthalate, a hardening agent such as a polyisocyanate compound, an abrasive such as α-iron oxide, aluminum oxide or chromium oxide, a lubricant such as a fatty acid ester or a fatty acid, an antistatic agent such as carbon black or a quaternary ammonium salt, or a dispersant such as lecithin or an alkylphosphoric ester.

A polyethylene terephthalate film is preferred as the non-magnetic support to be used in the present invention.

EXAMPLES

The following Examples will illustrate the present invention in more detail, but they should not be construed as limiting the scope of the invention.

EXAMPLE 1

| | |
|---|---|
| Vilon 200 | 68.3 parts by weight |
| (polyester resin manufactured by Toyobo Co., Ltd.) | |
| Sumidur N-3200 | 16.4 |
| (polyisocyanate compound manufactured by Sumitomo-Bayer) | |
| trisacetylaetonatoiron (III) | 2.1 |
| carbon black | 68.3 |
| (average particle size: 23 μm, oil absorption: 56 g DBP/100 g) | |
| methyl ethyl ketone | 241.4 |
| toluene | 241.4 |
| cyclohexanone | 361.2 |

methyl ethyl ketone 241.4 toluene 241.4 cyclohexanone 361.2

The above-mentioned mixture was milled with a sand mill, applied on a 75 μm-thick polyethylene terephthalate film in such a thickness as will provide a dry coating thickness of 0.5 μm, and dried to form an undercoat layer.

Subsequently, a given area of the undercoat layer was continuously rubbed with a swab sufficiently soaked with methyl ethyl ketone under a given applied pressure to find that the undercoat layer was not dissolved in methyl ethyl ketone even when rubbed 20 times.

EXAMPLE 2

| | |
|---|---|
| Nippolan 2301 | 68.3 parts by weight |
| (polyurethane resin manufactured by Nippon Polyurethane Industry Co., Ltd.) | |
| Sumidur N-3200 | 16.4 |
| (polyisocyanate compound manufactured by Sumitomo-Bayer) | |
| trisacetylacetonatoiron (III) | 2.1 |
| carbon black | 68.3 |
| (average particle size: 23 μm, oil absorption: 56 g DBP/100 g) | |
| methyl ethyl ketone | 241.4 |
| toluene | 241.4 |
| cyclohexanone | 361.2 |

An undercoat layer was formed using the above-mentioned mixture in substantially the same manner as that of Example 1. Subsequently, an undercoat layer dissolution test was conducted in the same manner as that of Example 1 to find that the undercoat layer was not dissolved in methyl ethyl ketone even when rubbed 20 times.

| | |
|---|---|
| Elitel | 35 parts by weight |
| (polyester resin manufactured by Unitika Ltd.) | |
| Nippolan 2301 | 35 |
| Coronate L | 20 |
| (polyisocyanate compound manufactured by Nippon Polyurethane Industry Co., Ltd.) | |
| trisacetylacetonatoiron (III) | 2.5 |

-continued

| | |
|---|---|
| carbon black | 57 |
| (average particle size: 31 μm, oil absorption: 70 g DBP/100 g) | |
| methyl ethyl ketone | 240 |
| toluene | 240 |
| cyclohexanone | 365 |

An undercoat layer was formed using the above-mentioned mixture in substantially the same manner as that of Example 1. The same test as that of Example 1 was conducted to find that the undercoat layer was not dissolved even when rubbed 20 times.

COMPARATIVE EXAMPLE 1

An undercoat layer was formed in substantially the same manner as that of Example 1 except that carbon black having an average particle size of 24 μm and an oil absorption of 170 g DBP/100 g was used instead of carbon black which was used in Example 1. The same test as that of Example 1 was conducted to find that the undercoat layer was dissolved when rubbed 10 times.

COMPARATIVE EXAMPLE 2

Substantially the same procedure as that of Example 1 was repeated except that 110 parts of Vilon and 25 parts of carbon black were used. The resulting undercoat layer was dissolved when rubbed 9 times.

COMPARATIVE EXAMPLE 3

Substantially the same procedure as that of Example 1 was repeated except that 31 parts of Vilon and 91 parts of carbon black were used. The resulting undercoat layer was dissolved when rubbed 7 times.

What is claimed is:

1. A magnetic recording medium comprising a non-magnetic support, a magnetic layer, and an undercoat layer provided therebetween, and said undercoat layer comprising:

(A) at least one resin selected from the group consisting of polyester resins having one or more hydroxyl groups and polyurethane resins having one or more hydroxyl groups;

(B) a polyisocyanate compound;

(C) at least one compound selected from the group consisting of organometallic compounds and tertiary amine compounds; and (D) carbon black having an average single particle size of 50 μm or smaller and an oil absorption of 100 g DBP/100 g or less;

and having an (A)/(D) content ratio of 30/70 to 70/30, by weight, a (B) content of 15 to 50 wt. % based on component (A), and a (C) content of 0.5 to 5 wt. % based on component

* * * * *